(12) United States Patent
Liu (10) Patent No.: US 12,450,778 B2
(45) Date of Patent: Oct. 21, 2025

(54) METHOD FOR CALIBRATING EXTRINSIC PARAMETERS OF CAMERA DEVICES, VEHICLE-MOUNTED DEVICE, AND STORAGE MEDIUM

(71) Applicant: HON HAI PRECISION INDUSTRY CO., LTD., New Taipei (TW)

(72) Inventor: Lun-Kang Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 19/011,847

(22) Filed: Jan. 7, 2025

(65) Prior Publication Data

US 2025/0292436 A1    Sep. 18, 2025

(30) Foreign Application Priority Data

Mar. 15, 2024    (CN) .......................... 202410296386.9

(51) Int. Cl.
 *G06T 7/80*    (2017.01)
 *G06T 7/13*    (2017.01)

(52) U.S. Cl.
 CPC ................. *G06T 7/80* (2017.01); *G06T 7/13* (2017.01); *G06T 2207/10024* (2013.01); *G06T 2207/30252* (2013.01)

(58) Field of Classification Search
 CPC .... G06T 7/80; G06T 7/13; G06T 2207/10024
 See application file for complete search history.

(56) References Cited

U.S. PATENT DOCUMENTS

| | | | | |
|---|---|---|---|---|
| 7,085,322 B2 * | 8/2006 | Ngai | ...................... | H04N 19/87 375/E7.22 |
| 7,143,083 B2 * | 11/2006 | Carlbom | ............... | G06F 16/786 707/999.005 |
| 7,433,029 B1 * | 10/2008 | Hsu | ........................ | G01B 11/26 356/141.5 |
| 7,796,155 B1 * | 9/2010 | Neely, III | .............. | G06V 20/52 348/157 |
| 7,932,923 B2 * | 4/2011 | Lipton | ..................... | G06T 7/20 348/143 |
| 10,154,176 B1 * | 12/2018 | Hicks | ................... | G06V 10/255 |
| 10,380,766 B2 * | 8/2019 | Dubout | ................. | G06V 10/44 |

(Continued)

FOREIGN PATENT DOCUMENTS

| | | | | |
|---|---|---|---|---|
| CN | 106803273 | | 6/2017 | |
| CN | 116958278 | | 10/2023 | |
| EP | 3809363 A1 * | 4/2021 | ............... | G06T 7/80 |

*Primary Examiner* — Irfan Habib
(74) *Attorney, Agent, or Firm* — ScienBiziP, P.C.

(57) ABSTRACT

The present application relates to a field of intelligent driving, and provides a method for calibrating extrinsic parameters of camera devices of a panoramic view system, a vehicle-mounted device, and a storage medium. The method uses the camera devices to shoot multiple preset calibration objects to obtain multiple images, the calibration objects include preset embedded information. Based on the embedded information, information is extracted from each of the multiple images to obtain calibration information of each calibration object in each captured image. Based on the calibration information and intrinsic parameters of each camera device, extrinsic parameters of each camera device are determined. The above method can improve an efficiency and an accuracy of an algorithm of calibrating the extrinsic parameters.

20 Claims, 5 Drawing Sheets

(56) References Cited

U.S. PATENT DOCUMENTS

| | | |
|---|---|---|
| 10,867,407 B2* | 12/2020 | Jia .................... G06T 7/80 |
| 11,393,126 B2* | 7/2022 | Markkassery ....... H04N 23/698 |
| 12,118,750 B1* | 10/2024 | Lipunov .............. H04N 17/002 |
| 12,211,235 B2* | 1/2025 | Han .................... G06T 7/80 |
| 12,243,325 B2* | 3/2025 | Li ...................... G06V 10/803 |
| 12,351,110 B2* | 7/2025 | Wang ................. B60R 1/27 |
| 12,373,987 B2* | 7/2025 | Jiang ................. H04N 13/246 |
| 2003/0093810 A1* | 5/2003 | Taniguchi .......... H04N 21/4334 725/112 |
| 2008/0193016 A1* | 8/2008 | Lim .................. G06F 16/7834 382/190 |
| 2009/0080706 A1* | 3/2009 | Tao .................. G06T 7/0004 382/110 |
| 2009/0244263 A1* | 10/2009 | Saito ................. G06T 7/593 348/47 |
| 2010/0097444 A1* | 4/2010 | Lablans .............. G03B 35/00 348/46 |
| 2012/0133780 A1* | 5/2012 | Zhang ............... H04N 17/002 348/E17.002 |
| 2012/0274776 A1* | 11/2012 | Gupta ............... G08B 13/19641 382/103 |
| 2013/0135474 A1* | 5/2013 | Sakano ............... G06V 20/56 348/148 |
| 2013/0147948 A1* | 6/2013 | Higuchi ............. G01B 11/14 348/135 |
| 2013/0169822 A1* | 7/2013 | Zhu .................... G06T 7/80 348/180 |
| 2013/0243250 A1* | 9/2013 | France ............... G06V 20/10 382/103 |
| 2016/0007912 A1* | 1/2016 | Hu .................... A61B 5/002 600/595 |
| 2017/0238055 A1* | 8/2017 | Chang ............... G06V 20/42 725/19 |
| 2018/0040141 A1* | 2/2018 | Guerreiro ........... G06V 20/56 |
| 2019/0102898 A1* | 4/2019 | Tanabe ............... H04N 13/128 |
| 2022/0122289 A1* | 4/2022 | Shang ................. G06T 17/00 |
| 2023/0023046 A1* | 1/2023 | Hu .................... G06T 3/4038 |
| 2023/0080638 A1* | 3/2023 | Guizilini ............. G06T 7/80 348/180 |
| 2024/0062402 A1* | 2/2024 | Varekamp ........... H04N 13/189 |
| 2024/0169587 A1* | 5/2024 | Han .................... G06T 7/70 |
| 2025/0104280 A1* | 3/2025 | Theos ................. G06T 7/80 |
| 2025/0104323 A1* | 3/2025 | Nonn ................. G06T 15/08 |

* cited by examiner

METHOD FOR CALIBRATING EXTRINSIC PARAMETERS OF CAMERA DEVICES, VEHICLE-MOUNTED DEVICE, AND STORAGE MEDIUM

TECHNICAL FIELD

The present application relates to a technology field of intelligent driving and camera calibration. Particularly, the present application relates to a method for calibrating extrinsic parameters of camera devices, a vehicle-mounted device, and a storage medium.

BACKGROUND TECHNIQUE

A panoramic view system installed in a vehicle can obtain multiple images around the vehicle through camera devices installed in a front direction, a back direction, a left direction, and a right direction of the vehicle. The panoramic view system further integrates these images to generate a panoramic view image to help a user to better understand distances between the vehicle and surrounding objects. Before integrating and stitching the images based on a relative position of each image relative to other images, it is necessary to calibrate extrinsic parameters of the camera device firstly, such as, a position, a direction, a focal length, or other parameters of the camera device. When relative positions of different images taken by different camera devices can be accurately calculated under the calibrated extrinsic parameters, the generated panoramic view image may have a correct viewing angle and a correct perspective relationship.

Therefore, an accuracy of the extrinsic parameters has a great impact on the generating of the panoramic view image.

DETAILED DESCRIPTION

In order to more clearly understand purposes, features and advantages of the present application, the present application is described in detail below in conjunction with accompanying drawings and predetermined embodiments. It should be noted that the embodiments of the present application and the features in the embodiments can be combined with each other without a conflict.

Unless otherwise defined, all technical and scientific terms used herein have the same meaning as those commonly understood by those skilled in the art to which the present application belongs. The terms used herein in the present application are only for the purpose of describing the embodiments in one embodiment and are not intended to limit the present application.

It should be noted that in this application, "at least one" means one or more, and "more than one" means two or more than two. "And/or" describes an association relationship of associated objects, indicating that three relationships may exist. For example, A and/or B can mean: A exists alone, A and B exist at the same time, and B exists alone, where A and B can be singular or plural. The terms "first", "second", "third", "fourth", etc. (if any) in the specification, claims and drawings of this application are used to distinguish similar objects, rather than to describe a predetermined order or a sequence.

In one embodiment, words such as "exemplary" or "for example" are used to indicate examples, illustrations or descriptions. Any embodiment or design described as "exemplary" or "for example" in the embodiments of the present application should not be interpreted as being more preferred or more advantageous than other embodiments or designs. Particularly, use of the words such as "exemplary" or "for example" is intended to present related concepts in a concrete way. The following embodiments and features in the embodiments may be combined with each other without a conflict.

In one embodiment, a panoramic view system installed in a vehicle can obtain a plurality of images around the vehicle through camera devices installed in front, back, left, and right directions of the vehicle, and integrate these images into a panoramic view image to help a user better understand distances between the vehicle and surrounding objects. When integrating and stitching images, it is necessary to first calibrate extrinsic parameters of the camera device, that is, to calibrate a position, a direction, a focal length and other parameters of the camera device so that relative positions of different images taken by different camera devices can be accurately calculated to ensure that the stitched panoramic view image has a correct viewing angle and a perspective relationship.

Particularly, there are two calibration methods commonly used in related technologies: (1) Each vehicle to be calibrated is required to drive to an exact center of a calibration area or at least to be parallel to one side of the calibration area. Each vehicle must measure a distance from a calibration object to a body of the vehicle (hereinafter "vehicle body") to obtain coordinates of the calibration object in a coordinate system of the vehicle body, and then obtain parameters of the camera device in the vehicle relative to the coordinate system of the vehicle body according to Zhengyou Zhang's calibration method. Since this method requires a manual distance measurement for each vehicle, a calibration efficiency is very low and cannot be deployed in an automated mass production line. (2) First, all parameters of a camera device of a reference vehicle are calibrated according to the method (1), and then camera devices of other vehicles of a same type are fixed in a same position, and finally the parameters of the camera device of the reference vehicle are directly applied to all the other vehicles of the same type. Although this method improves the calibration efficiency to a certain extent, due to an existence of installation errors (such as position errors, angle errors, etc.), directly adapting the parameters of the camera device of the reference vehicle to other vehicles results in large errors in the parameters of the camera devices of the other vehicles, thereby affecting a 360-degree surround view stitching effect.

In order to jointly calibrate the cameras devices installed in front, back, left and right directions of a vehicle, the related technology usually uses multiple identical checkerboard images or multiple black square images as calibration objects and lays them on a ground around the vehicle. Corner points of the calibration objects are determined by a corner point detection method, and positions of the corner points of the calibration objects are used as calibration information for jointly calibrating extrinsic parameters of the camera devices.

In addition, since the related technology usually uses multiple calibration objects that are completely identical to each other, in order to determine relative positions of different calibration objects and the vehicle in the captured image and to determine which camera device captured the calibration object, the related technology usually sorts the corner points of the detected calibration objects to determine the camera devices corresponding to different calibration objects, thereby facilitating a subsequent joint calibration of the extrinsic parameters of the camera devices.

Figure 1:
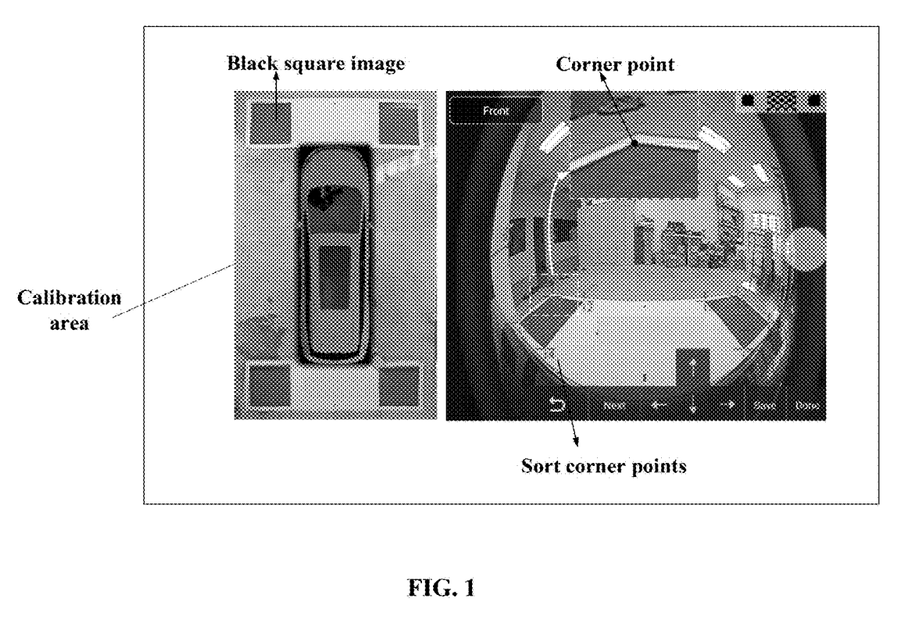
FIG. 1 is an example diagram of black square images of calibration objects provided by an embodiment of the present application.

For example, as shown in FIG. 1, a calibration object provided in the embodiment of the present application is an example diagram of black square images. As shown in an image of a top view on a left side of FIG. 1, four identical black square images are usually set around the vehicle in the related art; as shown in an image captured by a fisheye camera installed in front of the vehicle on a right side of FIG. 1, the captured image is detected using the related art to obtain corner points of the black square image, and the corner points are numbered and sorted, for example, a corner point of a upper left corner of the calibration object on a left side of the image taken by the fisheye camera in front of the vehicle is numbered as 1, and a corner point of a upper right corner of the calibration object on a left side of the image taken by the fisheye camera in front of the vehicle is numbered as 2, and so on, and different numbers are set for each corner point to distinguish images of different calibration objects.

Figure 2:
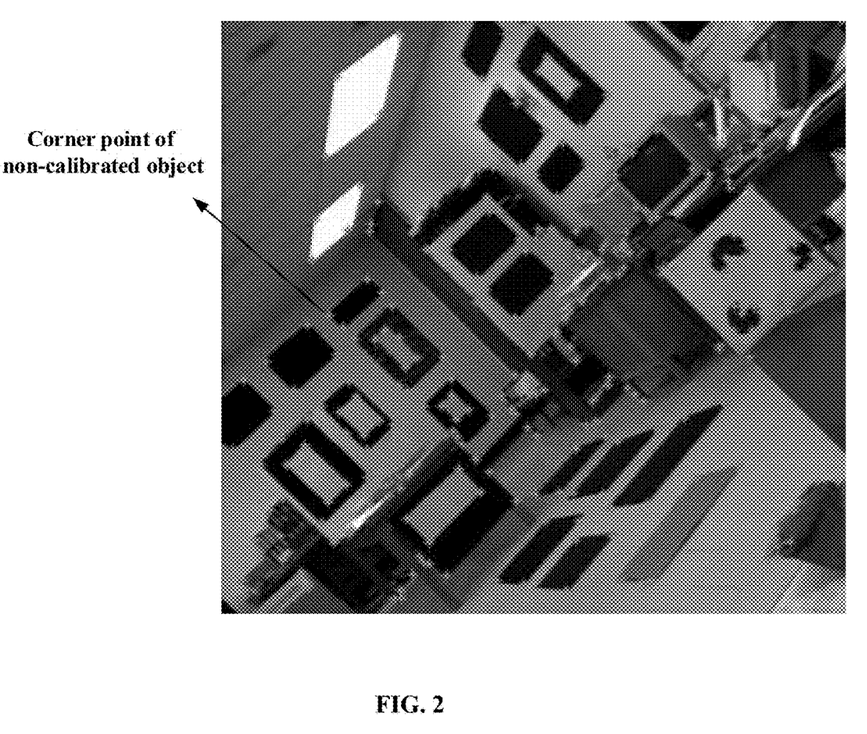
FIG. 2 is an example diagram of corner points of a non-calibration object provided by an embodiment of the present application.

However, the related technology may detect many corner points of non-calibrated objects, which may affect the efficiency and accuracy of the algorithm of calibrating extrinsic parameters. For example, as shown in FIG. 2, an example diagram of the corner points of non-calibrated objects provided in an embodiment of the present application is shown, where, since an environment includes many black squares similar to the black square image which is set as the calibration object, when detecting the corner points in the image, many corner points of non-calibrated objects will be detected. The related technology needs to eliminate the corner points of non-calibrated objects one by one, which reduces the efficiency and accuracy of the algorithm of calibrating extrinsic parameters.

To solve the above problems, the embodiment of the present application provides a method for calibrating extrinsic parameters of camera devices, which uses multiple calibration objects with preset embedded information to replace multiple identical checkerboard images or black square images in the related art; uses multiple camera devices of a panoramic view system to shoot multiple preset calibration objects to obtain multiple captured images; because the embedded information in each calibration object is different, the captured image can be extracted based on the embedded information corresponding to each calibration object, thereby obtaining calibration information corresponding to each calibration object; and uses the calibration information to jointly calibrate multiple camera devices of the panoramic view system. The present application can quickly and accurately locate the positions of the corner points of the calibration object when detecting the corner points of the calibration object in the captured image, avoiding mistaking the corner points of other objects in the environment for the corner points of the calibration object, thereby eliminating a need to spend time screening and eliminating the corner points; in addition, because each calibration object includes embedded information for indicating an orientation, it is not necessary to sort the corner points of the calibration object, thereby improving the efficiency and accuracy of the calibration of the extrinsic parameters of the camera device.

Figure 3:
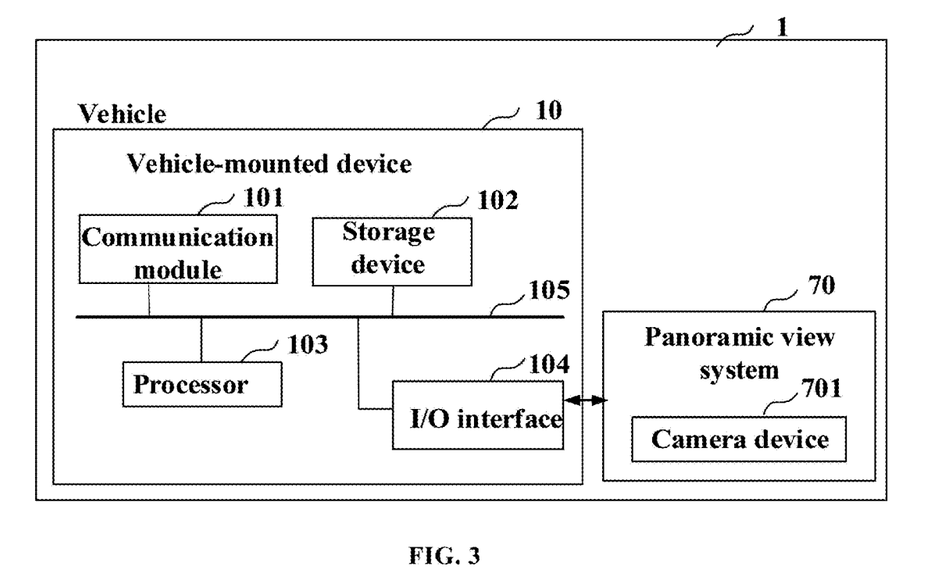
FIG. 3 is a structural diagram of a vehicle-mounted device provided in an embodiment of the present application.

FIG. 3 is a schematic diagram of a structure of a vehicle-mounted device provided in an embodiment of the present application. The embodiment of the present application does not impose any limitation on a type of the vehicle-mounted device.

As shown in FIG. 3, a vehicle-mounted device 10 can be installed in a vehicle 1, and the vehicle-mounted device 10 can include a communication module 101, a storage device 102, a processor 103, an input/output (I/O) interface 104, and a bus 105. The processor 103 is coupled to the communication module 101, the storage device 102, and the I/O interface 104 through the bus 105.

The communication module 101 may include a wired communication module and/or a wireless communication module. The wired communication module may provide one or more wired communication solutions such as a universal serial bus (USB), a controller area network (CAN) bus, a local interconnect network (LIN), a FlexRay vehicle network standard, etc. The wireless communication module may provide one or more wireless communication solutions such as a wireless fidelity (Wi-Fi), a Bluetooth (BT), a mobile communication network, a frequency modulation (FM), a near field communication (NFC) technology, an infrared technology (IR), etc.

The storage device 102 may include one or more random access memories (RAM) and one or more non-volatile memories (NVM). The random access memory can be directly read and written by the processor 103, and can be used to store executable programs (such as machine instructions) of an operating system or other running programs, and can also be used to store user and application data. The random access memory may be a static random-access memory (SRAM), a dynamic random access memory (DRAM), a synchronous dynamic random access memory (SDRAM), a double data rate synchronous dynamic random access memory (DDR SDRAM), etc.

The non-volatile memory may also store executable programs, user data, and application data, etc., and may be loaded into the random access memory in advance for direct reading and writing by the processor 103. The non-volatile memory may include a disk storage device and a flash memory.

The storage device 102 is used to store one or more computer programs. The one or more computer programs are configured to be executed by the processor 103. The one or more computer programs include multiple instructions, and when the multiple instructions are executed by the processor 103, the method for calibrating extrinsic parameters of the camera devices executed on the vehicle-mounted device 10 can be implemented.

In other embodiments, the vehicle-mounted device 10 further includes an external storage device interface for connecting to an external storage device to expand a storage capacity of the vehicle-mounted device 10.

The processor 103 may include one or more processing units, for example, the processor 103 may include an application processor (AP), a modem processor, a graphics processor (GPU), an image signal processor (ISP), a controller, a video codec, a digital signal processor (DSP), a baseband processor, and/or a neural-network processing unit (NPU), etc. Different processing units may be independent devices or integrated into one or more processors.

The processor 103 provides computing and control capabilities. For example, the processor 103 is used to execute a computer program stored in the storage device 102 to implement the method for calibrating extrinsic parameters of the camera devices.

The I/O interface 104 is used to provide a channel for a user input or a user output. For example, the I/O interface 104 can be used to connect various input and output devices, such as a mouse, a keyboard, a touch device, a display screen, etc., so that the user can enter information or information can be visualized.

The I/O interface 104 may also be used to provide a channel for a data transmission with a vehicle (e.g., vehicle 1 in FIG. 3) to implement a data interaction with a panoramic view system of the vehicle (e.g., a panoramic view system 70 in FIG. 3). The panoramic view system of the vehicle includes, but is not limited to: a plurality of camera devices (e.g., camera devices 701 in FIG. 3) installed at four positions such as a front, a back, a left, and a right of the vehicle, and the plurality of camera devices are used to capture images of an environment around the vehicle.

The bus 105 is at least used to provide a channel for a mutual communication among the communication module 101, the storage device 102, the processor 103, and the I/O interface 104 in the vehicle-mounted device 10.

It is understood that the structure illustrated in the embodiment of the present application does not constitute a predetermined limitation on the vehicle-mounted device 10. In other embodiments of the present application, the vehicle-mounted device 10 may include more or fewer components than shown in the figure, or combine certain components, or split certain components, or arrange the components differently. The components shown in the figure may be implemented in hardware, software, or a combination of software and hardware.

Figure 4:
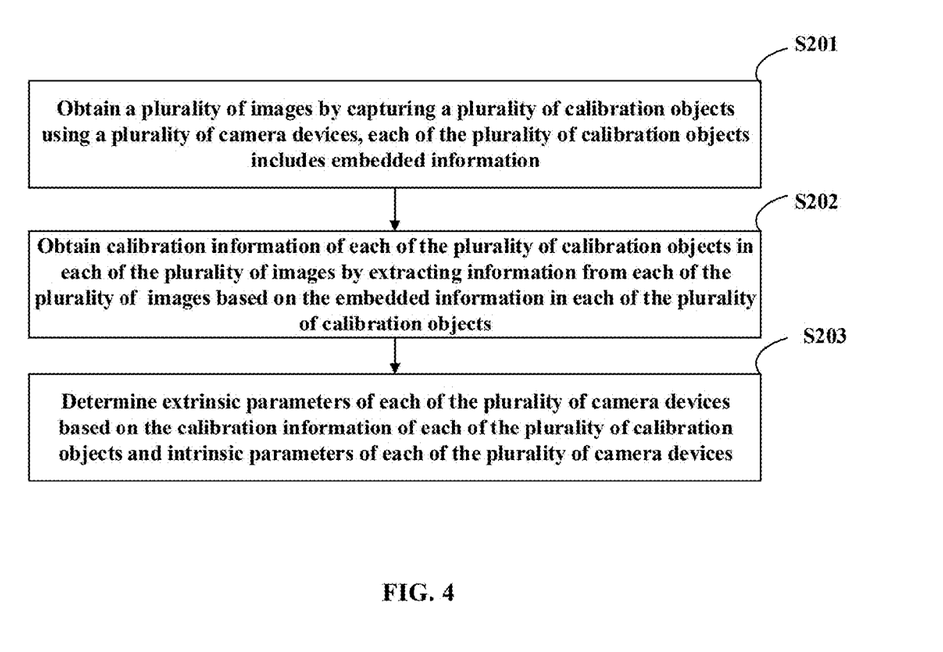
FIG. 4 is a flow chart of a method for calibrating extrinsic parameters of camera devices provided in an embodiment of the present application.

FIG. 4 is a flow chart of a method for calibrating extrinsic parameters of camera devices provided by an embodiment of the present application. The method for calibrating extrinsic parameters of the camera devices is applied to a vehicle-mounted device, such as the vehicle-mounted device 10 in FIG. 3, and particularly includes the following blocks. According to different requirements, an order of the blocks in the flow chart can be changed, and some blocks can be omitted.

S201, the vehicle-mounted device obtains a plurality of images by capturing a plurality of calibration objects using a plurality of camera devices of a panoramic view system, each of the plurality of calibration objects include embedded information.

The present application innovatively uses the calibration objects including preset embedded information to replace common images such as checkerboard images and black square images commonly used in the prior art. The preset embedded information of the calibration object may include but is not limited to a combination of one or more of the following information: information for indicating a boundary of the calibration object, information for indicating corner points of the calibration object, information for indicating a position of the calibration object relative to the vehicle, information for indicating a size of the calibration object, and information for indicating a distance and/or an orientation of the calibration object relative to a preset reference object. In addition, an embedded form of the embedded information may include but is not limited to a combination of one or more of the following forms: a predetermined graphic, a predetermined color, a predetermined symbol (such as text, numbers, characters, etc.). For details, please refer to the description in the subsequent embodiments.

In one embodiment, the embedded information includes one or more of: first information for indicating a boundary position of the calibration object, second information for indicating a position of a corner point of the calibration object, and third information for indicating orientation information of the calibration object, where the orientation information includes an orientation of the calibration object relative to the vehicle on which the panoramic view system is installed.

The first information includes one or more of a first predetermined graphic, a first predetermined color, and a first predetermined symbol; the second information includes one or more of a second predetermined graphic, a second predetermined color, and a second predetermined symbol; the third information includes one or more of a third predetermined graphic, a third predetermined color, and a third predetermined symbol.

Figure 5:
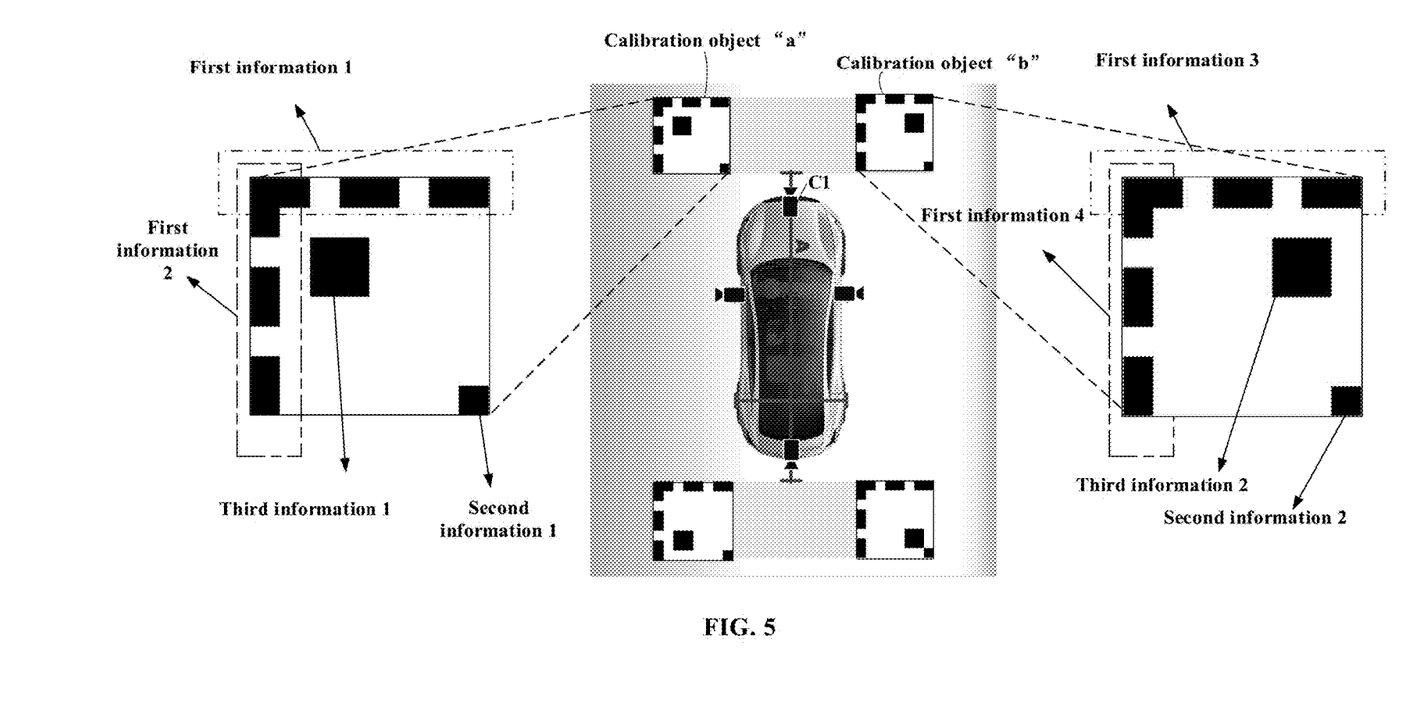
FIG. 5 is an example diagram of calibration objects provided in an embodiment of the present application.

Referring to FIG. 5, an example diagram of calibration objects provided in an embodiment of the present application is shown. As shown in FIG. 5, calibration objects are respectively set at a left front, a right front, a left rear, and a right rear of the vehicle, and each calibration object has embedded information different from other calibration objects.

For example, an enlarged view of the calibration object "a" on a leftmost side of FIG. 5 can be referred to. The calibration object "a" is a calibration object set at a left front of a vehicle. The first information of the calibration object "a" includes: first information 1, first information 2, second information 1, and third information 1. Among them, the first information 1 and the first information 2 are used to indicate two adjacent boundary positions of the calibration object "a", where a rightmost side of the first information 1 can also be used to indicate a position of an upper right corner point of the calibration object "a", a bottom of the first information 2 can also be used to indicate a position of a lower left corner point of the calibration object "a", and an intersection of the first information 1 and the first information 2 can be used to indicate a position of an upper left corner point of the calibration object "a"; the second information 1 is used to indicate a position of a lower right corner point of the calibration object "a"; the third information 1 is used to indicate a relative position of the calibration object "a" relative to the vehicle, that is, the calibration object is located at a left front of the vehicle.

Similar to the calibration object "a", a reference can also be made to an enlarged view of a calibration object "b" on a rightmost side of FIG. 5. The calibration object "b" is a calibration object disposed at a right front of the vehicle. The first information of the calibration object "b" includes first information 3 and first information 4, which are used to indicate two adjacent boundary positions and positions of corner points of the calibration object "b"; the calibration object "b" includes second information 2, which is used to indicate a position of a lower right corner point of the calibration object "b"; the calibration object "b" includes third information 2, which is used to indicate a relative position of the calibration object "b" relative to the vehicle, that is, the calibration object "b" is located at a right front of the vehicle.

It should be noted that although the first information 2 in the calibration object "a" and the first information 4 in the calibration object "b" look the same in user's perspective, both are set at the left boundary of the corresponding calibration object, but in the perspective of the camera device installed in front of the vehicle, the first information 2 is different from the first information 4. For example, in a perspective of a camera device C1 in FIG. 5, a distance of the first information 2 is farther than that of the first information 4. Therefore, the first information can be used to distinguish the boundary positions of different calibration objects.

FIG. 5, similar to the calibration objects disposed at the left front and right front of the vehicle, the calibration objects disposed at the left rear and right rear of the vehicle also have embedded information similar to that in the above embodiment.

The embedded information for indicating the orientation, corner points, boundaries and other information of the calibration objects can facilitate a subsequent extraction of information of the calibration object in the captured image, avoid extracting the information of an image in an area of a non-calibration object, achieve an accurate positioning of each calibration object, and simultaneously obtain the orientation, corner points, boundaries and other information of each calibration object without the need for additional blocks such as sorting corner points, thereby improving the efficiency and accuracy of a calibration of extrinsic parameters based on the calibration information.

In one embodiment, the embedded information may also include fourth information, and the fourth information includes coded information obtained by encoding one or more parameters of a size of the calibration object, a serial number of the calibration object, and a distance and/or an orientation of the calibration object relative to a preset reference object.

In one embodiment, the fourth information includes one or more of a fourth predetermined graphic, a fourth predetermined color, and a fourth predetermined symbol.

Figure 6:
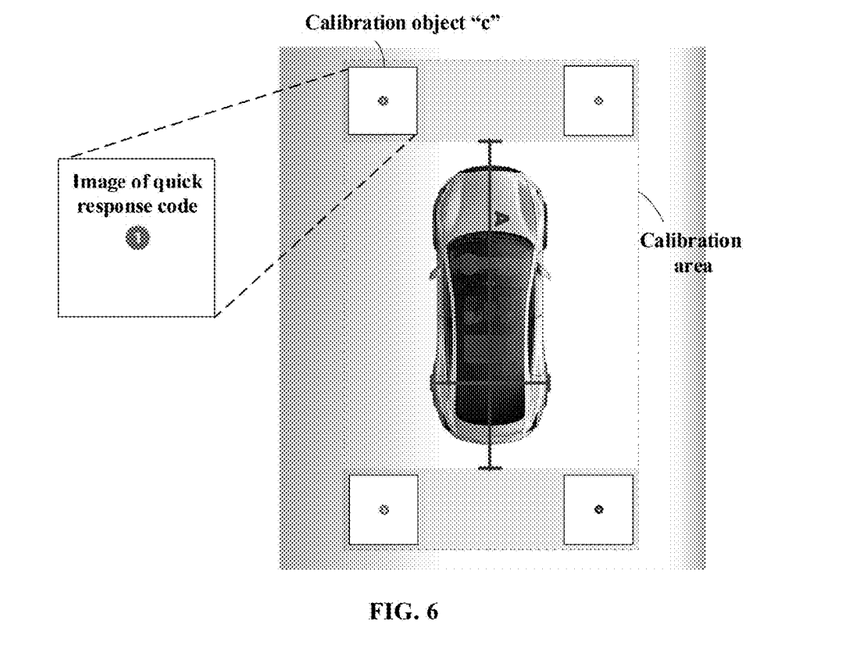
FIG. 6 is an example diagram of calibration objects provided in another embodiment of the present application.

Referring to FIG. 6, an example diagram of a calibration object provided in another embodiment of the present application is shown. As shown in FIG. 6, the calibration object may be an image of a quick response (QR) code (e.g., a QR code shown in form of a rectangular area in FIG. 6), and the fourth information may be a graphic in a form of the quick response code, which may also include a digital number of each calibration object. In addition, the quick response code of each calibration object may include coded information obtained by encoding one or more of the parameters of the calibration object. It is understood that the quick response code may also include embedded information such as the first information, the second information, and the third information.

For example, taking the calibration object "c" as an example, the coded information may include but is not limited to one or more of following combinations: a size of the calibration object being 0.6 meters×0.6 meters, a serial number of the calibration object being 1, a world distance of a center point of the calibration object relative to a center point (i.e., preset reference object) of a calibration area being (−3 meters, 4 meters, 5 meters), where the "−3 meters" indicates that there are three meters horizontally to a left of the center point of the calibration area; the "4 meters" represents a longitudinal distance of four meters in front of the center point of the calibration area, and the "5 meters" indicates that a straight-line distance from the center point of the calibration area to the center point of the calibration area is five meters, so the world distance can be used to indicate an orientation relative to the preset reference object. In one embodiment, the calibration area can be an area including all the calibration objects.

Through the above embedded information indicating the size, the serial number, the distance and/or the orientation of the calibration object relative to the preset reference object, it is convenient to avoid extracting information of the image of the area of the non-calibration object when extracting information of the calibration object in the captured image in the subsequent process, so as to accurately locate each calibration object, and decode the encoded information to obtain the size, the serial number, the distance and/or the orientation of each calibration object relative to the preset reference object, without the need for additional blocks such as sorting corner points, thereby improving the efficiency and accuracy of an extrinsic calibration based on the calibration information. Among them, the position of each corner point of each calibration object can also be determined based on simple plane geometry knowledge according to the size of each calibration object and the distance relative to the preset reference object. Reference can be made to an introduction in the subsequent embodiments.

In one embodiment, the embedded information may further include fifth information, and the fifth information is used to provide instruction information to the user, and the fifth information includes one or more of a fifth predetermined graphic, a fifth predetermined color, and a fifth predetermined symbol. The instruction information is used to indicate to the user a laying plan when laying any one of the calibration objects, for example, the laying plan may include but is not limited to a laying orientation of the calibration object, a laying position of any corner point of the calibration object, a laying position of any boundary of the calibration object, the distance and/or orientation of the calibration object relative to a preset reference object, etc.

Through the fifth information, it is convenient for the user to determine how each calibration object should be laid when laying the calibration object, so as to avoid laying multiple calibration objects in a wrong position or laying the calibration objects in a wrong way, thereby avoiding a confusion and ensuring that the vehicle-mounted device can accurately extract the embedded information of the calibration object in the subsequent process.

In other embodiments, the embedded information of the calibration object may include any one or more combinations of the above information, and the embedded information of the calibration object may also include other more or less information, which is not particularly limited in this application. In addition, each kind of embedded information may be information that can be recognized by a machine (such as a vehicle-mounted device) or information that can be recognized by a user, which is not particularly limited in this application.

S202, the vehicle-mounted device obtains calibration information of each of the plurality of calibration objects in each of the plurality of images by extracting information from each of the plurality of images based on embedded information in each of the plurality of calibration objects.

In one embodiment, before extracting information from each image based on the embedded information, the method further includes performing a preprocessing on the plurality of images, and the preprocessing includes but is not limited to: a size adjustment of resizing each of the plurality of images to a size required for an input of a subsequent algorithm (such as a template matching algorithm); an image optimization of improving a texture clarity of each of the plurality of images based on an interpolation algorithm (such as a bilinear interpolation algorithm); a grayscale processing of converting each of the plurality of images into an grayscale image using a weighted averaging method; a filtering processing of using a preset filter (such as a mean filter, a median filter, etc.) to smooth each of the plurality of images to remove noise; a distortion correction, for example, when the camera device is a fisheye camera, the object in the image may be distorted, and the image can be distorted based on parameters of the fisheye camera (such as a focal length, a principal point coordinate, a distortion coefficient, etc.) and a pre-selected correction model (such as a Pinhole model, a fisheye model, etc.). By preprocessing the plurality of images, an accuracy of extraction information from the embedded information in the plurality of images can be improved.

In one embodiment, the calibration objects may include embedded information in various forms, and different methods may be used to extract information from the embedded information in different forms.

In one embodiment, if the calibration object includes the first information, the second information, and the third information, the obtaining calibration information of the calibration object in each of the plurality of images by extracting information from each image based on embedded information included in the calibration object may include: determining a first image area corresponding to each of the plurality of calibration objects in each of the plurality of images, such that a plurality of first image areas are determined; obtaining the calibration information of each of the plurality of calibration objects by performing a feature extraction and a feature recognition on each of the plurality of first image areas based on one or more of the first information, the second information, and the third information in a corresponding one of the plurality of first image areas, where the calibration information of each of the plurality of calibration objects further includes one or more of the boundary position, the position of the corner point, and the orientation information of each of the plurality of calibration objects.

In one embodiment, any one image recognition algorithm can be used to determine the first image area corresponding to the calibration object, and it is not limited in the present application. For example, the image recognition algorithm can be a template matching algorithm, and the template matching algorithm can use a standard calibration object to perform an area matching with each image, thereby obtaining the first image area corresponding to each calibration object in each image. Among them, due to different camera devices having different viewing angles, a rotation angle of the calibration object in the images may change, but the template matching algorithm can accurately identify the first image area corresponding to each calibration object without being affected by the rotation angle of the calibration object.

In one embodiment, an algorithm for a feature extraction and a feature recognition that is commonly used (for example, a scale-invariant feature conversion algorithm, a fast corner detection algorithm, an accelerated robust feature detection algorithm, a Brute-Force matcher, etc.) can be used to detect one or more of the first information, the second information, and the third information in the first image area, so as to obtain one or more of the boundary positions, the positions of the corner points, and the orientation information of the calibration object.

In one embodiment, if each of the plurality of calibration objects further includes the fourth information, the obtaining calibration information of each of the plurality of calibration objects in each of the plurality of images by extracting information from each of the plurality of images based on embedded information included in each of the plurality of calibration objects may include: determining a second image area corresponding to each of the plurality of calibration objects in each of the plurality of images, such that a plurality of second image areas are determined; obtaining the calibration information of each of the plurality of calibration objects by decoding the fourth information in a corresponding one of the plurality of second image areas, where the calibration information of each of the plurality of calibration objects further includes one or more of the size, the serial number of each of the plurality of calibration objects, the distance and/or the orientation of each of the plurality of calibration objects relative to the preset reference object.

Taking the calibration object as an image of a quick response (QR) code as an example, decoding the fourth information in the second image area may include scanning the QR code to obtain binary data included in the QR code; decoding the binary data according to an encoding rule and a version information of the QR code, which usually requires using processing technologies such as an error correction coding, a masking to restore decoded data corresponding to the fourth information; the decoded data is usually represented in a form of a character string, and can be further parsed and processed using a text recognition algorithm or a decryption algorithm to obtain one or more information of the size, the serial number, the distance and/or the orientation of the calibration object relative to the preset reference object.

Block S203, the vehicle-mounted device determines extrinsic parameters of each of the plurality of camera devices based on the calibration information of each of the plurality of calibration objects and intrinsic parameters of each of the plurality of camera devices.

In one embodiment, the intrinsic parameters may be known data or unknown data, which is not limited in this application. If the intrinsic parameters are known data, the extrinsic parameters of each camera device may be determined based on the calibration information of each calibration object and the intrinsic parameters of each camera devices using a preset joint optimization algorithm (e.g., a ghosting error minimization algorithm).

In one embodiment, if the intrinsic parameters are unknown data, the method may include: determining the positions of corner points of each calibration object based on the calibration information, and using a preset parameter estimation algorithm (such as a feature point matching algorithm) to determine the intrinsic parameters and a distortion matrix of each camera device; and determining the extrinsic parameters of each camera device based on the intrinsic parameters and the distortion matrix of each camera device, using a preset joint optimization algorithm (such as a ghosting error minimization algorithm).

In one embodiment, a process of jointly calibrating all the camera devices of the vehicle can also be referred to a chessboard calibration method, and it is only necessary to replace target feature points used in the chessboard calibration method with information such as the positions of the corner points in the calibration information. Particularly, it includes: obtaining multiple images obtained by each camera device shooting multiple preset calibration objects; performing a calibration of intrinsic parameters and a calibration of extrinsic parameters on each camera device to obtain initial parameters such as intrinsic parameters and extrinsic parameters of each camera device; extracting the calibration information of each calibration object in each direction, such as the positions of the corner points, and matching feature points between the camera devices based on the calibration information; optimizing and updating the initial parameters of each camera device based on matching information of feature points using a method such as a minimizing ghosting error, so that the updated parameters can make the calibration object photographed by the corresponding camera device more accurately aligned; evaluating an accuracy of the updated parameters, if an evaluation result indicates that the accuracy of the updated parameters is less than a preset threshold, repeating the above blocks until the parameters with an accuracy greater than or equal to the preset threshold are obtained, and the joint calibration of all camera devices is completed.

In one embodiment, among the positions of the corner points used in the above embodiments, the positions of the corner points in the calibration object (such as the calibration objects shown in FIG. 5) can be directly determined by an image feature detection algorithm, and the positions of the corner points in the calibration objects (such as the calibration objects shown in FIG. 6) can also be determined based on the size of each calibration object and the distance relative to the preset reference object and a series of coordinate transformations. For details, please refer to an introduction in the following embodiments.

Figure 7:
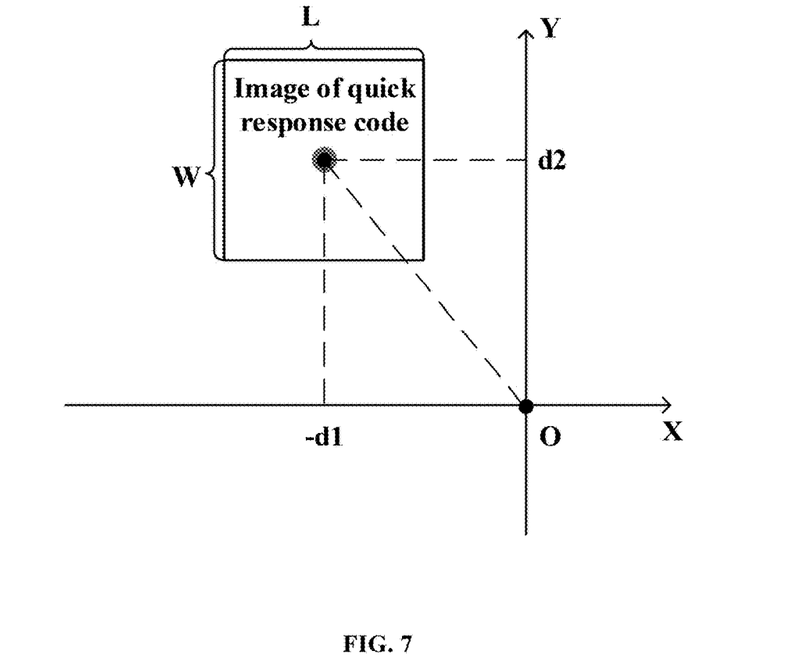
FIG. 7 is an example diagram of coordinates of an upper left corner point of a calibration object "c" in a coordinate system OXY corresponding to a calibration area provided by an embodiment of the present application.

Referring to FIG. 7, taking an upper left corner point of the calibration object "c" (e.g., a QR code shown in form of a rectangular area) located in a left front of the vehicle as an example, the position of the upper left corner point in the calibration object "c" can be expressed as: (−d1−L/2, d2+W/2), which are coordinates in the coordinate system OXY with a center point of a calibration area as a coordinate origin. Where: "L" and "W" can be determined according to the size of the calibration object, for example, if the size is 0.6 meters×0.6 meters, then L=W=0.6; −d1 and d2 can be determined according to a distance between the calibration object and the preset reference object, for example, a world distance between the center point of the calibration object and the center point of the calibration area (i.e., the preset reference object) is (−3 meters, 4 meters, 5 meters), where the "−3 meters" indicates three meters horizontally to a left of the center point of the calibration area; the "4 meters" indicates a longitudinal distance of four meters in front of the center point of the calibration area, then d1=3, d2=4; then the coordinates of the upper left corner point of the calibration object "c" in the coordinate system OXY can be expressed as: (−3−0.6/2, 4+0.6/2)=(−3.3, 4.3), which can be regarded as the world coordinates of the corner point in the coordinate system OXY.

The application environment of the present application may be a vehicle maintenance plant. For example, a calibration area is set up in the maintenance plant, and one calibration object is set up at each of four corners of the calibration area. When the vehicle to be calibrated drives to a center of the calibration area or at least remains parallel to one side of the calibration area, information such as a length and a width of the vehicle, and a relative position of each camera device installed in the vehicle relative to a center point of a overlooking perspective of the vehicle can be obtained. Thus, after determining a relative position of each corner point of each calibration object relative to the center point of the calibration area (for example, the world coordinates (−3.3, 4.3) in the coordinate system OXY), the relative position of each corner point of each calibration object relative to each camera device is determined, including the world coordinates (for example, world coordinates (−3.3, 2.3) in the world coordinate system with an installation position of each camera device as the origin). Then, according to a conversion matrix between the world coordinate system of the camera device and a camera coordinate system, the world coordinates of each corner point relative to each camera device are converted to coordinates in the camera coordinate system corresponding to each camera device to obtain the position of each corner point in the image.

Through the above embodiment, the distance between the vehicle and the calibration object in the calibration area can also be directly calculated, without measuring the distance between the vehicle and the calibration object when the vehicle enters the calibration area for calibration, thereby improving the efficiency of calibration.

In other embodiments, multiple calibration objects with different sizes and different distances from the center point of the calibration area can be set in the calibration area, where the size of each calibration object and the distance of each calibration object from the center point of the calibration area can have a positive correlation with a size of the vehicle, thereby facilitating the extrinsic calibration of vehicles of different models, without the need to move and reset the calibration object before calibrating, thereby improving the efficiency of the extrinsic calibration. For example, compared with a car, the calibration object corresponding to a large truck will be farther away from the center point of the calibration area and larger in size.

The method for calibrating extrinsic parameters of the camera devices provided in the embodiment of the present application uses multiple calibration objects with preset embedded information to replace multiple identical checkerboard images or black square images in the related art; uses multiple camera devices of the panoramic view system to shoot multiple preset calibration objects to obtain multiple images; because the embedded information in each calibration object is different, each of the multiple images can be extracted based on the embedded information corresponding to each calibration object, thereby obtaining the calibration information corresponding to each calibration object; and uses the calibration information to jointly calibrate the multiple camera devices of the panoramic view system. The present application can quickly and accurately locate the positions of corner points of the calibration objects when performing a corner point detection on the calibration object in the image, avoiding mistaking the corner point of other objects in the environment for the corner points of the calibration objects, thereby eliminating the need to spend time screening and eliminating wrong corner points; in addition, because each calibration object includes embedded information for indicating the orientation, there is no need to sort the corner points of the calibration objects, thereby improving the efficiency and accuracy of the camera extrinsic calibration.

Figure 8:
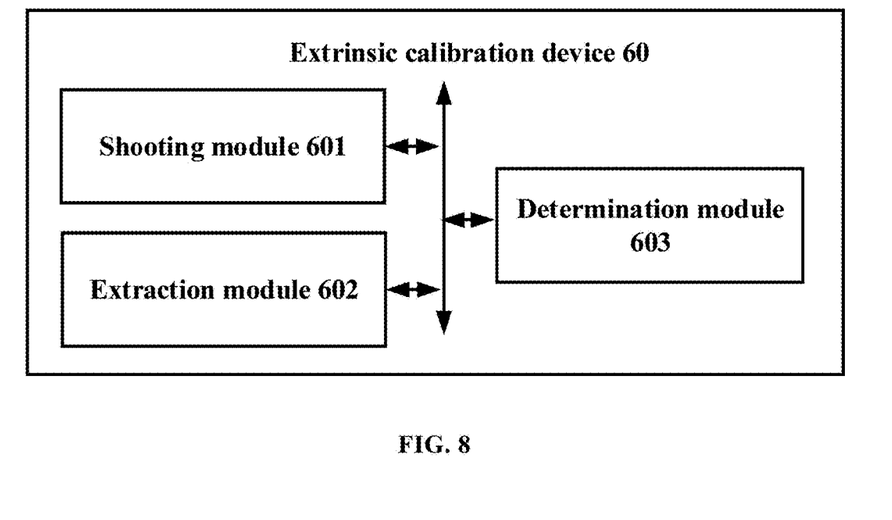
FIG. 8 is a structure diagram of an extrinsic calibration device provided in an embodiment of the present application.

FIG. 8 is a structural diagram of an extrinsic calibration device provided in an embodiment of the present application.

In some embodiments, an extrinsic calibration device 60 may include multiple functional modules composed of computer program segments. Computer programs of various program segments in the extrinsic calibration device 60 may be stored in a storage device of the vehicle-mounted device and executed by at least one processor to perform (see FIG. 4 for details) a function of calibrating extrinsic parameters.

In this embodiment, the extrinsic calibration device 60 can be divided into multiple functional modules according to the functions it performs. The functional modules may include: a shooting module 601, an extraction module 602, and a determination module 603. The module referred to in this application refers to a series of computer program segments that can be executed by at least one processor and can complete a fixed function, which are stored in a storage device. In this embodiment, an implementation of a functional of each module in the extrinsic calibration device 60 can refer to the above definition of the method for calibrating extrinsic parameters of the camera devices, and will not be repeated here.

The shooting module 601 is used to shoot a plurality of preset calibration objects using a plurality of camera devices of a panoramic view system to obtain a plurality of images, where each of the plurality of preset calibration object include preset embedded information.

The extraction module 602 is used to extract information from each of the plurality of images based on the embedded information of each preset calibration object to obtain calibration information of each calibration object in each image.

The determination module 603 is used to determine extrinsic parameters of each of the plurality of camera devices based on the calibration information of each calibration object and the intrinsic parameters of each camera device.

An embodiment of the present application further provides a computer-readable storage medium, on which a computer program is stored. The computer program includes program instructions. The method implemented when the program instructions are executed can refer to the methods in the above-mentioned embodiments of the present application.

The computer-readable storage medium may be an internal storage device of the vehicle-mounted device described in the above embodiment, such as a hard disk or a memory of the vehicle-mounted device. The computer-readable storage medium may also be an external storage device of the vehicle-mounted device, such as a plug-in hard disk, a smart media card (SMC), a secure digital (SD) card, a flash card, etc. equipped on the vehicle-mounted device.

In some embodiments, the computer-readable storage medium may include a program storage area and a data storage area, where the program storage area may store an operating system, an application required for at least one function, etc.; the data storage area may store data created according to the use of the vehicle-mounted device, etc.

In the above embodiments, the description of each embodiment has its own emphasis. For parts that are not described or recorded in detail in a certain embodiment, reference can be made to the relevant descriptions of other embodiments.

Those of ordinary skill in the art appreciates that units and algorithm blocks of each example described in conjunction with the embodiments disclosed herein can be implemented in electronic hardware, or a combination of computer software and electronic hardware. Whether these functions are performed in hardware or software depends on a predetermined application and design constraints of the technical solution. Professional and technical personnel can use different methods to implement the described functions for each predetermined application, but such implementation should not be considered to be beyond the scope of this application.

In the embodiments provided in the present application, it should be understood that the disclosed device/terminal equipment and methods can be implemented in other ways. For example, embodiments of the device/terminal equipment described above are only schematic. For example, the division of the modules or units is only a logical function division. There may be other division methods in actual implementation, such as multiple units or components can be combined or integrated into another system, or some features can be ignored or not executed. Another point is that the mutual coupling or direct coupling or communication connection shown or discussed can be through some interfaces, indirect coupling or communication connection of devices or units, which can be electrical, mechanical or other forms.

The units described as separate components may or may not be physically separated, and the components shown as units may or may not be physical units, that is, they may be located in one place or distributed on multiple network units. Some or all of the units may be selected according to actual needs to achieve the purpose of the solution of this embodiment.

The embodiments described above are only used to illustrate the technical solutions of the present application, rather than to limit them. Although the present application has been described in detail with reference to the aforementioned embodiments, the ordinary skill in the art should understand that the technical solutions described in the aforementioned embodiments may still be modified, or some of the technical features may be replaced by equivalents. Such modifications or replacements do not deviate the essence of the corresponding technical solutions from the spirit and scope of the technical solutions of the embodiments of the present application, and should all be included in the protection scope of the present application.

What is claimed is:

1. A method for calibrating extrinsic parameters of a plurality of camera devices of a panoramic view system, comprising:
    obtaining a plurality of images by capturing a plurality of calibration objects using the plurality of camera devices, each of the plurality of calibration objects comprising embedded information;
    obtaining calibration information of each of the plurality of calibration objects in each of the plurality of images by extracting information from each of the plurality of images based on the embedded information in each of the plurality of calibration objects; and
    determining extrinsic parameters of each of the plurality of camera devices based on the calibration information of each of the plurality of calibration objects and intrinsic parameters of each of the plurality of camera devices.

2. The method according to claim 1, wherein the embedded information comprises one or more of: first information for indicating a boundary position of each of the plurality of calibration objects, second information for indicating a position of a corner point of each of the plurality of calibration objects, and third information for indicating orientation information of each of the plurality of calibration objects, wherein the orientation information comprises an orientation of each of the plurality of calibration objects relative to a vehicle on which the panoramic view system is installed.

3. The method according to claim 2, wherein the first information comprises one or more of a first predetermined graphic, a first predetermined color, and a first predetermined symbol; the second information comprises one or more of a second predetermined graphic, a second predetermined color, and a second predetermined symbol; the third information comprises one or more of a third predetermined graphic, a third predetermined color, and a third predetermined symbol.

4. The method according to claim 2, wherein the obtaining calibration information of each of the plurality of calibration objects in each of the plurality of images by extracting information from each of the plurality of images based on the embedded information in each of the plurality of calibration objects comprises:
  determining a first image area corresponding to each of the plurality of calibration objects in each of the plurality of images, such that a plurality of first image areas are determined; and
  obtaining the calibration information of each of the plurality of calibration objects by performing a feature extraction and a feature recognition on each of the plurality of first image areas based on one or more of the first information, the second information, and the third information in a corresponding one of the plurality of first image areas, wherein the calibration information of each of the plurality of calibration objects further comprises one or more of the boundary position, the position of the corner point, and the orientation information of each of the plurality of calibration objects.

5. The method according to claim 2, wherein the embedded information further comprises fourth information, and the fourth information comprises coded information obtained by encoding one or more of a size of the calibration object, a serial number of the calibration object, and a distance and/or an orientation of the calibration object relative to a preset reference object.

6. The method according to claim 5, wherein the fourth information further comprises one or more of a fourth predetermined graphic, a fourth predetermined color, and a fourth predetermined symbol.

7. The method according to claim 6, wherein the obtaining calibration information of each of the plurality of calibration objects in each of the plurality of images by extracting information from each of the plurality of images based on the embedded information in each of the plurality of calibration objects comprises:
  determining a second image area corresponding to each of the plurality of calibration objects in each of the plurality of images, such that a plurality of second image areas are determined; and
  obtaining the calibration information of each of the plurality of calibration object by decoding the fourth information in a corresponding one of the plurality of second image areas, wherein the calibration information of each of the plurality of calibration objects further comprises one or more of a size, a serial number of each of the plurality of calibration objects, a distance and/or an orientation of each of the plurality of calibration objects relative to a preset reference object.

8. The method according to claim 2, wherein the embedded information further comprises fifth information, and the fifth information provides instruction information to a user, and the fifth information comprises one or more of a fifth predetermined graphic, a fifth predetermined color, and a fifth predetermined symbol.

9. A vehicle-mounted device, comprising a storage device and at least one processor, the storage device storing at least one instruction, which when executed by the at least one processor, causing the at least one processor performing a method for calibrating extrinsic parameters of a plurality of camera devices of a panoramic view system, wherein the method comprises:
  obtaining a plurality of images by capturing a plurality of calibration objects using the plurality of camera devices, each of the plurality of calibration objects comprising embedded information;
  obtaining calibration information of each of the plurality of calibration objects in each of the plurality of images by extracting information from each of the plurality of images based on the embedded information in each of the plurality of calibration objects; and
  determining extrinsic parameters of each of the plurality of camera devices based on the calibration information of each of the plurality of calibration objects and intrinsic parameters of each of the plurality of camera devices.

10. The vehicle-mounted device according to claim 9, wherein the embedded information comprises one or more of: first information for indicating a boundary position of each of the plurality of calibration objects, second information for indicating a position of a corner point of each of the plurality of calibration objects, and third information for indicating orientation information of each of the plurality of calibration objects, wherein the orientation information comprises an orientation of each of the plurality of calibration objects relative to a vehicle on which the panoramic view system is installed.

11. The vehicle-mounted device according to claim 10, wherein the first information comprises one or more of a first predetermined graphic, a first predetermined color, and a first predetermined symbol; the second information comprises one or more of a second predetermined graphic, a second predetermined color, and a second predetermined symbol; the third information comprises one or more of a third predetermined graphic, a third predetermined color, and a third predetermined symbol.

12. The vehicle-mounted device according to claim 10, wherein the obtaining calibration information of each of the plurality of calibration objects in each of the plurality of images by extracting information from each of the plurality of images based on the embedded information in each of the plurality of calibration objects comprises:
  determining a first image area corresponding to each of the plurality of calibration objects in each of the plurality of images, such that a plurality of first image areas are determined; and
  obtaining the calibration information of each of the plurality of calibration objects by performing a feature extraction and a feature recognition on each of the plurality of first image areas based on one or more of the first information, the second information, and the third information in a corresponding one of the plurality of first image areas, wherein the calibration information of each of the plurality of calibration objects further comprises one or more of the boundary position, the position of the corner point, and the orientation information of each of the plurality of calibration objects.

13. The vehicle-mounted device according to claim 10, wherein the embedded information further comprises fourth information, and the fourth information comprises coded information obtained by encoding one or more of a size of the calibration object, a serial number of the calibration object, and a distance and/or an orientation of the calibration object relative to a preset reference object.

14. The vehicle-mounted device according to claim 13, wherein the fourth information further comprises one or more of a fourth predetermined graphic, a fourth predetermined color, and a fourth predetermined symbol.

15. The vehicle-mounted device according to claim 14, wherein the obtaining calibration information of each of the plurality of calibration objects in each of the plurality of images by extracting information from each of the plurality of images based on the embedded information in each of the plurality of calibration objects comprises:
   determining a second image area corresponding to each of the plurality of calibration objects in each of the plurality of images, such that a plurality of second image areas are determined; and
   obtaining the calibration information of each of the plurality of calibration object by decoding the fourth information in a corresponding one of the plurality of second image areas, wherein the calibration information of each of the plurality of calibration objects further comprises one or more of a size, a serial number of each of the plurality of calibration objects, a distance and/or an orientation of each of the plurality of calibration objects relative to a preset reference object.

16. The vehicle-mounted device according to claim 10, wherein the embedded information further comprises fifth information, and the fifth information provides instruction information to a user, and the fifth information comprises one or more of a fifth predetermined graphic, a fifth predetermined color, and a fifth predetermined symbol.

17. A non-transitory computer-readable storage medium having a computer program stored thereon, which when executed by a processor, a method for calibrating extrinsic parameters of a plurality of camera devices of a panoramic view system is implemented, wherein the method comprises:
   obtaining a plurality of images by capturing a plurality of calibration objects using the plurality of camera devices, each of the plurality of calibration objects comprising embedded information;
   obtaining calibration information of each of the plurality of calibration objects in each of the plurality of images by extracting information from each of the plurality of images based on the embedded information in each of the plurality of calibration objects; and
   determining extrinsic parameters of each of the plurality of camera devices based on the calibration information of each of the plurality of calibration objects and intrinsic parameters of each of the plurality of camera devices.

18. The non-transitory computer-readable storage medium according to claim 17, wherein the embedded information comprises one or more of: first information for indicating a boundary position of each of the plurality of calibration objects, second information for indicating a position of a corner point of each of the plurality of calibration objects, and third information for indicating orientation information of each of the plurality of calibration objects, wherein the orientation information comprises an orientation of each of the plurality of calibration objects relative to a vehicle on which the panoramic view system is installed.

19. The non-transitory computer-readable storage medium according to claim 18, wherein the first information comprises one or more of a first predetermined graphic, a first predetermined color, and a first predetermined symbol; the second information comprises one or more of a second predetermined graphic, a second predetermined color, and a second predetermined symbol; the third information comprises one or more of a third predetermined graphic, a third predetermined color, and a third predetermined symbol.

20. The non-transitory computer-readable storage medium according to claim 18, wherein the obtaining calibration information of each of the plurality of calibration objects in each of the plurality of images by extracting information from each of the plurality of images based on the embedded information in each of the plurality of calibration objects comprises:
   determining a first image area corresponding to each of the plurality of calibration objects in each of the plurality of images, such that a plurality of first image areas are determined; and
   obtaining the calibration information of each of the plurality of calibration objects by performing a feature extraction and a feature recognition on each of the plurality of first image areas based on one or more of the first information, the second information, and the third information in a corresponding one of the plurality of first image areas, wherein the calibration information of each of the plurality of calibration objects further comprises one or more of the boundary position, the position of the corner point, and the orientation information of each of the plurality of calibration objects.

* * * * *